United States Patent
Dudar et al.

(10) Patent No.: US 11,518,238 B1
(45) Date of Patent: Dec. 6, 2022

(54) SYSTEM AND METHOD FOR CONTROLLING FLOW IN A FUEL RECIRCULATION LINE

(71) Applicant: Ford Global Technologies, LLC, Dearborn, MI (US)

(72) Inventors: Aed M. Dudar, Canton, MI (US); Dennis Seung-Man Yang, Canton, MI (US); Jeevagan Natarajan, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/504,735

(22) Filed: Oct. 19, 2021

(51) Int. Cl.
| | |
|---|---|
| *B60K 15/03* | (2006.01) |
| *B60K 15/04* | (2006.01) |
| *G07C 5/08* | (2006.01) |
| *B60K 15/035* | (2006.01) |

(52) U.S. Cl.
CPC ........ *B60K 15/03519* (2013.01); *B60K 15/04* (2013.01); *G07C 5/0808* (2013.01); *B60K 2015/03217* (2013.01)

(58) Field of Classification Search
CPC .............. B60K 15/03519; B60K 15/04; B60K 2015/03217; G07C 5/0808
See application file for complete search history.

(56) References Cited

U.S. PATENT DOCUMENTS

| | | | | |
|---|---|---|---|---|
| 3,907,153 A * | 9/1975 | Mutty | ...................... | B67D 7/54 141/59 |
| 4,395,991 A | 8/1983 | Miyachi et al. | | |
| 4,762,156 A * | 8/1988 | Rich | ................ | B60K 15/03504 141/46 |
| 4,934,417 A * | 6/1990 | Bucci | ..................... | B60K 15/04 220/746 |
| 5,462,100 A * | 10/1995 | Covert | ............. | B60K 15/03519 137/589 |
| 5,579,742 A * | 12/1996 | Yamazaki | ........ | B60K 15/03504 123/520 |
| 5,819,796 A | 10/1998 | Kunimitsu et al. | | |
| 6,405,718 B1 * | 6/2002 | Yoshioka | ........... | F02M 25/0809 123/198 D |

(Continued)

FOREIGN PATENT DOCUMENTS

EP 0781677 A1 7/1997

OTHER PUBLICATIONS

Non-Final Office Action for U.S. Appl. No. 17/243,779, dated Feb. 18, 2022, 11 pages.

*Primary Examiner* — Phutthiwat Wongwian
*Assistant Examiner* — Arnold Castro
(74) *Attorney, Agent, or Firm* — Brooks Kushman P.C.; Vincent Mastrogiacomo

(57) ABSTRACT

A fuel system, a method of fueling a vehicle, and a vehicle are provided. The fuel system has a recirculation line connecting a fuel tank to a fuel fill inlet. An ejector is positioned within the recirculation line, and a valve is positioned within a drain line fluidly connecting the ejector to the fuel tank. A pressure sensor is positioned to measure a pressure associated with the drain line between the ejector and the valve. A controller is in communication with the pressure sensor, and the controller configured to, in response to initiation of a refueling event, determine a state of the valve based on the pressure.

20 Claims, 6 Drawing Sheets

(56) References Cited

U.S. PATENT DOCUMENTS

| | | | |
|---|---|---|---|
| 7,152,638 B2 * | 12/2006 | Ganachaud | B60K 15/03504 |
| | | | 141/303 |
| 7,383,856 B2 | 6/2008 | Martis et al. | |
| 7,726,363 B2 | 6/2010 | Benjey et al. | |
| 8,888,901 B2 | 11/2014 | Kimoto | |
| 8,931,523 B2 | 1/2015 | Hagen et al. | |
| 9,242,551 B2 * | 1/2016 | Criel | B60K 15/03504 |
| 9,267,467 B2 | 2/2016 | Peters et al. | |
| 9,732,706 B2 | 8/2017 | Dudar et al. | |
| 9,765,735 B2 * | 9/2017 | Walter | B60K 15/03519 |
| 10,288,013 B2 | 5/2019 | Dudar | |
| 2013/0269532 A1 * | 10/2013 | Kimoto | B60K 15/03519 |
| | | | 96/108 |
| 2015/0337777 A1 | 11/2015 | Hagen | |

\* cited by examiner

SYSTEM AND METHOD FOR CONTROLLING FLOW IN A FUEL RECIRCULATION LINE

TECHNICAL FIELD

Various embodiments relate to a vehicle fuel system with a recirculation line.

BACKGROUND

A fuel system for a vehicle has a fuel tank with a fuel fill port. The fuel tank may be periodically filled or refueled via the fuel fill port. The fuel system may additionally be connected by a vapor line to an evaporative emissions system with a canister to adsorb fuel vapors. The fuel system may be provided with a recirculation line connecting the vapor line to the fuel fill port to recirculate fuel vapor during refueling to reduce air entrainment and reduce further vaporization of fuel within the tank.

SUMMARY

In an embodiment, a fuel system is provided with a fuel tank, and a fuel fill inlet fluidly connected to the fuel tank to receive fuel dispensed from an external fuel supply device. A recirculation line has a first end fluidly connected to the fuel fill inlet and a second end fluidly connected to the fuel tank. An ejector is positioned within the recirculation line, and a valve is positioned within a drain line fluidly connecting the ejector to the fuel tank. A pressure sensor is positioned to measure a pressure associated with the drain line between the ejector and the valve. A controller is in communication with the pressure sensor, and the controller configured to, in response to initiation of a refueling event, determine a state of the valve based on the pressure.

In another embodiment, a method of fueling a vehicle is provided. Liquid fuel is dispensed into a fuel tank via a fuel fill inlet. Vapor is recirculated from the fuel tank to the fuel fill inlet via a recirculation line with an ejector in response to the liquid fuel being dispensed. A vacuum is drawn on a check valve via the ejector thereby maintaining the check valve in a closed position to prevent fluid flow through a drain line and the check valve, with the drain line fluidly connecting the recirculation line and the fuel tank. A pressure in the drain line between the ejector and the check valve is monitored while the liquid fuel is being dispensed to determine a position of the check valve. A flag associated with the check valve is set in response to the pressure being less than an atmospheric pressure.

In an embodiment, a vehicle is provided with a fuel tank and a fuel fill inlet fluidly connected to the fuel tank to receive fuel dispensed from an external fuel supply device. A recirculation line has a first end fluidly connected to the fuel fill inlet and a second end fluidly connected to the fuel tank. An ejector is positioned within the recirculation line. A check valve fluidly connects the ejector to the fuel tank via a drain line such that the ejector draws suction on the check valve to maintain the check valve in a closed position in response to vapor flow through the recirculation line and ejector during fueling of the fuel tank, and liquid fuel in the recirculation line drains into the fuel tank via the check valve and the drain line. A pressure sensor is positioned to measure a pressure in the drain line between the ejector and the check valve. An evaporative emissions system has a fuel vapor canister, with the evaporative emissions system fluidly connected to the recirculation line between the ejector and the second end via a control valve. A controller is configured to, in response to initiation of a refueling event, monitor the pressure, set a first flag associated with the check valve in response to the pressure being less than an atmospheric pressure prior to pulsing the control valve, pulse the control valve, and set a second flag associated with the check valve in response to the pressure being greater than the atmospheric pressure subsequent to pulsing the control valve.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
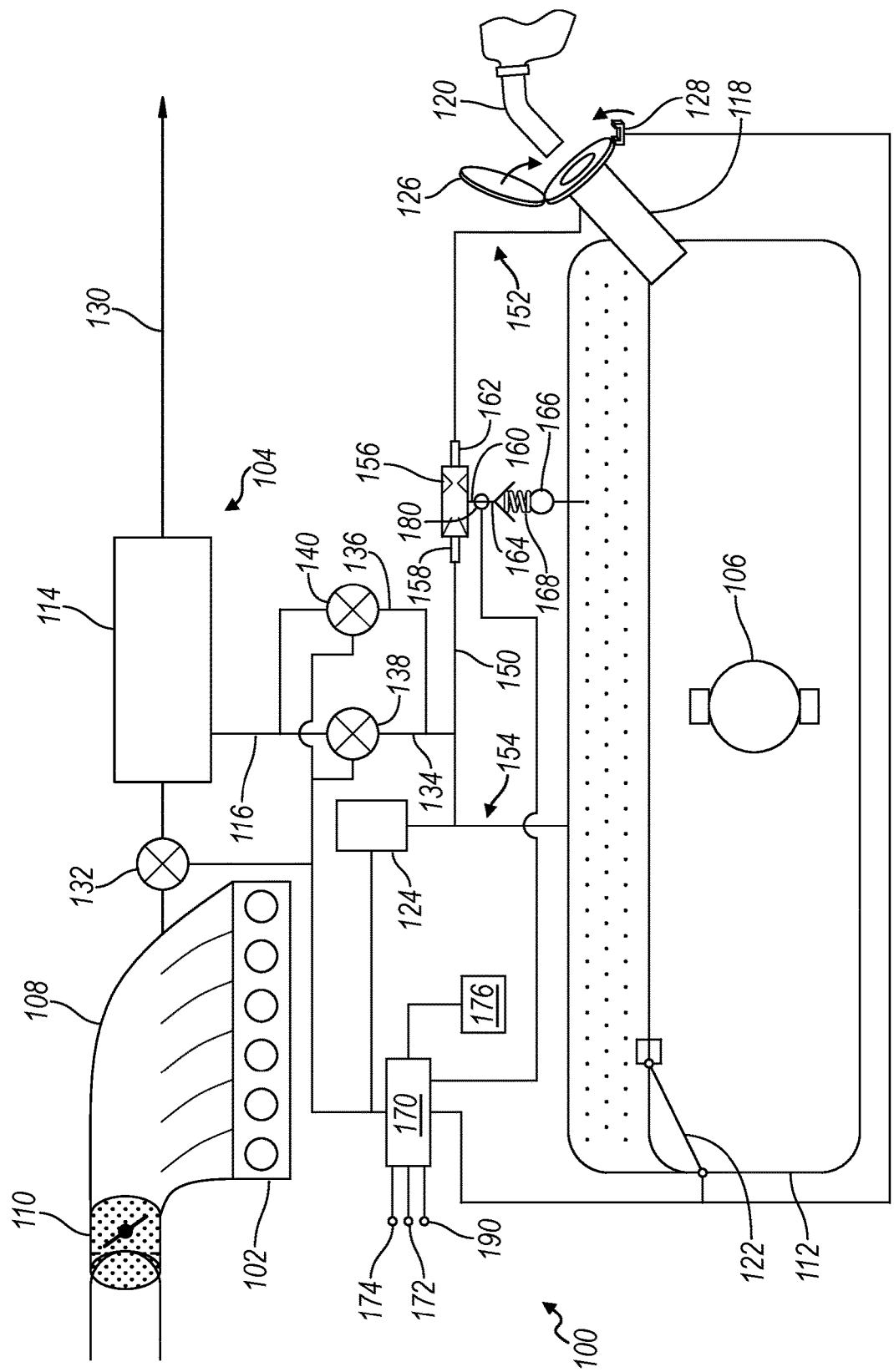
FIG. 1 illustrates a schematic view of a vehicle fuel system according to an embodiment.

FIG. 1 illustrates a fuel system 100 for a vehicle. The vehicle may be a conventional vehicle, or may be a hybrid vehicle powered by both an internal combustion engine as well as another propulsion source such as an electric motor. The fuel system 100 delivers fuel to an internal combustion engine 102, and is also provided with an evaporative emissions system 104. The fuel system 100 to the engine has a fuel pump 106 to pressurize fuel to deliver to the engine 102, and may include a fuel injector system according to one example.

The engine 102 has one or more cylinders, an engine intake manifold 108 and an engine exhaust manifold (not shown). The engine intake 108 has a throttle 110 fluidly coupled to the engine intake manifold.

The fuel system 100 has a fuel storage tank 112. The fuel tank 112 is sized to receive a volume of fuel. The fuel tank may be provided by a single tank, or multiple tanks fluidly connected to one another. In various non-limiting examples, the fuel may be a liquid fuel such as gasoline, diesel, alcohol fuels, a mixture thereof, or the like. As used herein, fluid refers to a substance in its liquid phase state, vapor or gas phase state, or a saturated liquid-vapor mixture.

Vapors generated in the fuel system 100 may be directed to an evaporative emissions system 104. The evaporative emission system 104 has a fuel vapor canister 114 fluidly connected to the fuel tank 112 via a vapor recovery line 116 or vent line 116. The fuel vapor canister 114 is fluidly connected to the engine intake manifold 108 to purge vapors in the canister 114 to the engine 102. The vapor recovery line 116 may include one or more conduits and one or more valves for isolating the fuel tank 112 during certain conditions, as described in further detail below.

The fuel tank 112 in the fuel system 100 may be periodically filled, fueled, refilled or refueled from an external fuel source via a fuel fill inlet 118. The fuel fill inlet 118 has a neck or filler pipe and may be sized to receive a nozzle or other fuel dispensing device of the external fuel source 120. According to various examples, the external fuel source 120 may be a fuel pump at a gas station, a portable gas can or gas tank, or a mobile refueling system such as a refueling vehicle or truck. The fuel system 100 may be provided with a fuel level sensor 122, also known as a fuel level indicator, to indicate the fuel level in the fuel tank 112 to the vehicle operator, e.g. via a fuel gauge or other indicator in a vehicle instrument panel. The fuel tank 112 may additionally be provided with a fuel tank pressure transducer 124, or fuel tank pressure sensor 124, to sense the pressure within the fuel tank, and the sensor 124 may be positioned in the vent line 116.

The fuel fill inlet 118 may be closed via a fuel fill cap 126 or other closure member. The fuel fill cap 126 may include a sealing member to seal the cap to the fuel tank 112, and prevent fluids, including vapor from exiting the fuel tank 112 via the fuel fill inlet 118 when the cap 126 is closed. Alternatively, the fuel fill cap 126 may be provided by a valve, e.g. in a capless fuel tank. The fuel fill cap 126 or a refueling door may additionally include a refueling lock or refueling locking mechanism 128 with a latch or other element to prevent the fuel fill cap 126 from being opened or removed, or to prevent an external fuel source nozzle 120 from opening the valve in a capless system. A controller as described below may control the locking mechanism 128 to open or unlock the refueling lock, for example, to limit access to the fuel tank 112, or to prevent an operator from opening the fuel fill cap 126 when a fuel tank 112 pressure is above a threshold pressure value. The refueling lock mechanism 128 may be actively controlled, e.g. via a solenoid, and is unlocked when the fuel tank 112 pressure is below a threshold pressure value. Alternatively, locking and unlocking of the refueling lock mechanism 128 may be passively controlled via a pressure diaphragm or the like. In other examples, the fuel system 100 may be provided without a refueling lock mechanism 128, and the fuel fill inlet may be closed via a cap that is manually connected to the fuel fill inlet, or via a valve such as in a capless fuel tank.

The fuel vapor canister 114 of the evaporative emissions system 104 may be filled with an adsorbent material, such as activated carbon, to temporarily trap or retain fuel vapors from the fuel tank 112, e.g. during fueling the fuel tank or during vehicle operation. The fuel vapor canister 114 may include an atmospheric ventilation line 130 between the canister and atmosphere for venting vapors from the canister 114 to atmosphere and/or for drawing fresh outside air into the canister 114.

A canister purge valve (CPV) 132 is positioned between the fuel vapor canister 114 and the intake manifold 108 to control the flow of fuel vapor from the canister 114 into the engine 102. The CPV 132 may be opened during a canister 114 purge process, for diagnostics of the evaporative emissions system 104 and/or fuel system 100, and the like.

Vehicles may be required to have diagnostics to validate the integrity of the fuel system 100, including the evaporative emissions system 104, for potential leaks, and to purge the canister 114 of the evaporative emissions system 104. Generally, the evaporative emissions system 104 is purged when the engine 102 is operating such that the operating engine combusts the fuel vapors.

The ventilation line 116 may include a first conduit 134 and a second conduit 136 arranged for parallel flow between the fuel tank 112 and the canister 114. A tank pressure control (TPC) valve 138 may be positioned within the first conduit 134. A refueling (RF) valve 140 may be positioned within the second conduit 136. Each of the TPC and RF valves 138, 140 may be separately controlled. Furthermore, each of the TPC and RF valves 138, 140 may be normally closed valves. The TPC and RF valves 138, 140 control venting of the fuel tank 112 to the canister 114. The TPC valve 138 may be provided with a smaller orifice or aperture than the RF valve 140.

The fuel tank 112 may be a sealed fuel tank, as is shown in FIG. 1, such that the fuel tank 112 may be at a higher or lower pressure than outside, atmospheric pressure. For example, a sealed fuel tank 112 may reach pressures as high as 30-40 kPa above atmospheric pressure, or 5-10 kPa below atmospheric pressure. The fuel tank 112 pressure may vary from atmospheric pressure based on diurnal temperature cycles. For a sealed fuel tank 112, the tank walls may be formed from a metal or other structural material to withstand pressure changes within the fuel tank. The fuel tank 112 therefore contains any vaporized fuel during vehicle operation or from diurnal temperature changes, and the canister 114 adsorbs fuel vapors from depressurization of the fuel tank 112 and during refueling.

Figure 2:
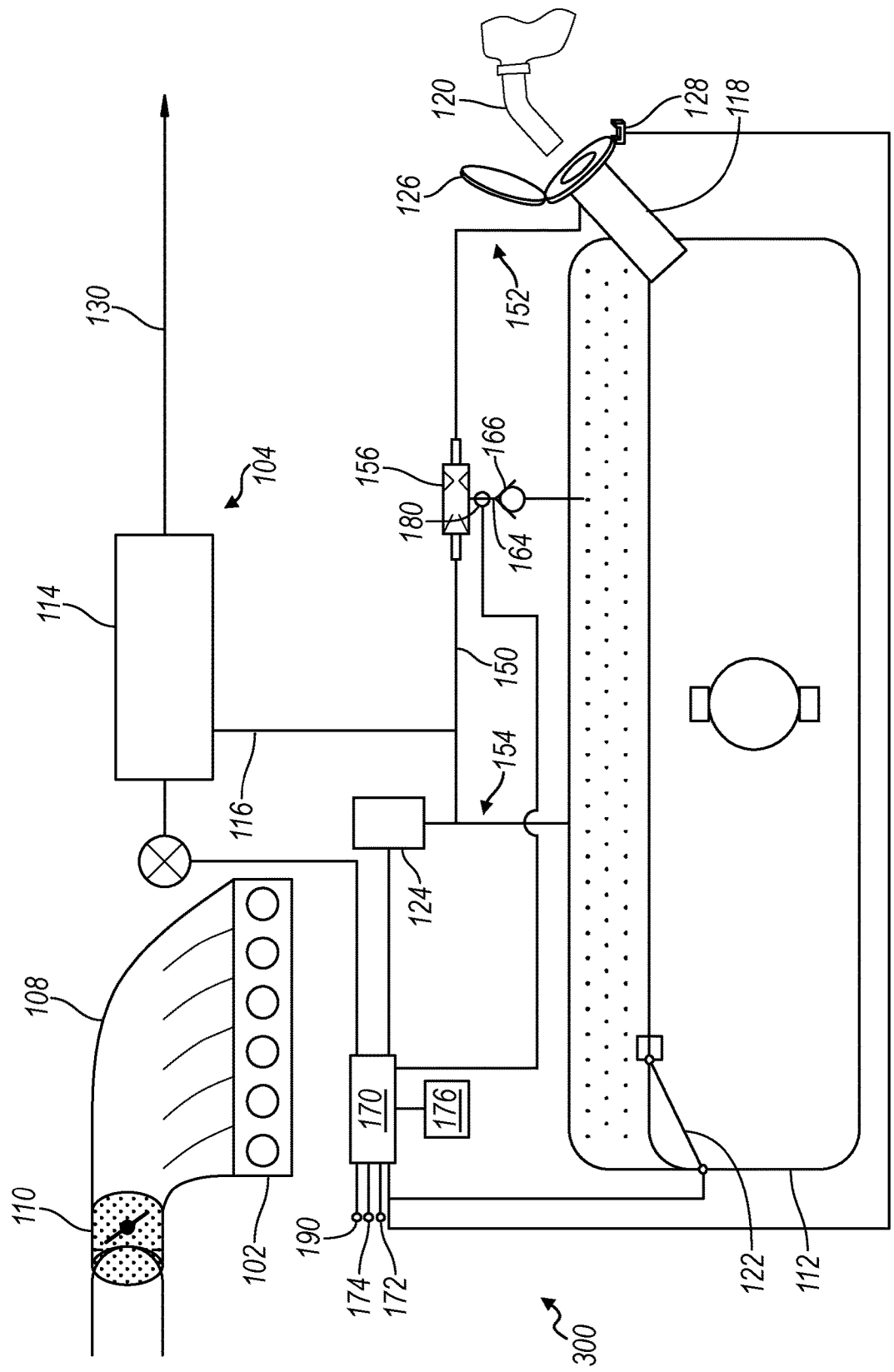
FIG. 2 illustrates a schematic view of a vehicle fuel system according to another embodiment.

In other examples, the fuel system 100 may be provided with only one valve, such as fuel tank isolation valve, in the ventilation line 116 to control fluid flow between the fuel tank 112 and the canister 114. Alternatively, The fuel system 100 may be provided without either valve 138, 140 such that the ventilation line 116 is only an open passage between the canister 114 and the fuel tank 112 or recirculation line 150, as shown in FIG. 2. According to these examples, the fuel tank 112 is not a sealed or pressurized fuel tank, such that the pressure within the fuel tank 112 stays generally close to or within a predetermine range of atmospheric pressure. In one example, the pressure in the fuel tank stays within 0.1-1.0 kPa above or below atmospheric pressure.

The fuel system 100 also has a recirculation line 150 with a first end 152 and a second end 154. The first end 152 is fluidly connected to the fuel fill inlet 118. The second end 154 is fluidly connected to the fuel tank 112 at a location away from or spaced apart from the fuel fill inlet 118, and furthermore may be fluidly connected to or form a portion of the ventilation line 116. The recirculation line 150 may additionally include one or more vent valves to the fuel tank 112 such as grade vent valve, or the like (not shown).

During fueling of the fuel tank 112, the recirculation line 150 allows for vapor displaced by the increasing liquid fuel in the fuel tank 112 to flow from the second end 154 of the recirculation line 150 to the first end 152 of the recirculation line and back to the fuel fill inlet 118. The vapor recirculation through the recirculation line 150 may reduce air entrainment by fuel flowing into the fuel tank 112 and hence reduce fuel vaporization inside the tank 112. This may allow for a reduction in size of the vapor canister 114 and associated adsorbent material.

The recirculation line 150 may additionally provide a passage directly between the fuel filling inlet 118 and the evaporative emissions system 104, and bypass the fuel tank 112. For a bottom feeding tank, a vapor path between the fuel filling inlet 118 and the evaporative emissions system 104 and canister 114 may become blocked at higher fuel levels within the fuel tank 112, and the recirculation line 150 provides a vapor passage to the fuel filling inlet 118 for diagnostic purposes.

The recirculation line 150 has an ejector 156 positioned within an intermediate location of the recirculation line 150 between the first and second ends 152, 154. The ejector 156 may be positioned within a local low spot or trap in the recirculation line 150, and in one example, is positioned at the lowest point in the recirculation line 150 that is close to the fuel tank 112. The first and second conduits 134, 136 or ventilation line 116 for the evaporative emissions system 104 may be connected to the recirculation line 150 between the second end 154 of the recirculation line and the ejector 156.

The ejector 156 may be provided as a passive vacuum ejector. The ejector 156 has a motive fluid inlet 158 to a primary nozzle, a secondary flow inlet 160, a converging-diverging nozzle, and an outlet 162. During refueling, vapor flow through the recirculation line 150 flows into the motive fluid inlet 158, through the converging-diverging nozzle, and through the outlet 162. This flow of vapor through the ejector 156 creates a vacuum on the secondary flow inlet 160 via the Venturi effect to draw in and entrain fluid from the secondary flow inlet 160 into the ejector 156 and converging diverging nozzle.

The converging diverging nozzle within the ejector 156 may replace a fixed orifice that is otherwise provided within the recirculation line 150 to limit vapor flow through the recirculation line 150 and prevent vapor from exiting the fuel filling inlet 118 during refueling such that the recirculation line 150 according to the present disclosure does not have a separate fixed orifice apart from the ejector 156.

The recirculation line 150 includes a drain conduit 164 or drain line. The drain line 164 is connected to the secondary flow inlet 160 of the ejector at one end and is connected to the fuel tank 112 at the other end. A valve 166 is positioned within the drain conduit 164 between the secondary flow inlet 160 to the ejector and the fuel tank 112. The valve 166 is movable between a closed position and an open position, with the closed position preventing flow through the drain line 164. Therefore, the ejector 156 is positioned to draw suction on the valve 166 to maintain the valve 166 in a closed position in response to vapor flow through the recirculation line 150 and the ejector 156 during fueling of the fuel tank 112. By closing the valve 166 during refueling, the recirculation line 150 is not fluidly short circuited by vapor flow through the drain line 164, which would cause a bypass to first end 152 of the recirculation line and the fuel filling inlet 118 and may increase vapor generation during refueling.

The valve 166 may be provided as a passive valve, such as a passive check valve. The valve 166 may be a normally closed valve, a normally open valve, or an indeterminate valve.

The valve 166 may further be provided with a biasing member 168, such as a spring. The biasing member 168 may bias the valve 166 towards an open position by exerting a force on the valve member. When the valve 166 is biased towards an open position, the force provided by the biasing member 168 is selected such that it is overcome by suction force in the secondary inlet 160 of the ejector 156 to close the valve 166, or move the valve 166 to the closed position. The valve 166 may further be a normally open valve without a biasing member, with gravity acting on the valve 166 to move it towards an open position, with the ejector 156 drawing vacuum on the valve 166 to close it.

During refueling, vapor is displaced in the fuel tank 112 by the added liquid fuel from the external source 120. This displaced vapor flows into the ventilation line 116 and second end 154 of the recirculation line 150, through the ejector 156, and back through the first end 152 of the recirculation line into the fuel filling inlet 118. The fuel vapor therefore acts as a motive fluid through the ejector 156 and enters via the motive fluid inlet 158, and exits via the outlet 162. The flow of vapor through the ejector 156 draws a vacuum on the secondary inlet 160 and the valve 166, to maintain the valve 166 in a closed position and prevent gas flow through the drain line 164. As the fuel vapor flows into the fuel filling inlet 118 from the recirculation line 150, it may be further entrained by the liquid fuel stream into the fuel tank 112, further enhancing vapor flow through the recirculation line 150.

When fueling the fuel tank 112, the fuel level within the fuel tank 112 may reach the first end 152 or the second end 154 of the recirculation line 150, and furthermore, liquid fuel may be able to enter the recirculation line 150, ventilation line 116, TPC valve 138, RF valve 140, or evaporative emissions system 104. This may occur when refueling the tank 112 on uneven or sloped terrain, or may occur when trickle filling the fuel tank 112. Trickle filling the fuel tank 112 is when an operator continues to add fuel to the tank 112 after an automatic cutoff switch causes the dispensing device 120 to stop pumping fuel. When there is liquid fuel within the recirculation line 150 or elsewhere in the evaporative emissions system 104, the liquid may pool or otherwise reach the valve 166 in the drain line 164.

The valve 166 allows for draining any fuel in the TPC or RF valves 138, 140, the evaporative emissions system 104, or recirculation line 150 back into the fuel tank 112. For example, when fueling the vehicle, fuel vapor flows through the recirculation line 150 until the liquid fuel level reaches the first end 152 or second end 154 of the recirculation line 150, and potentially enters the TPC valve 138, RF valve 140, or recirculation line 150, which blocks or stops the flow of vapor through the recirculation line 150. With no flow through the recirculation line 150, there is no flow through the ejector 156, and the ejector 156 stops drawing a vacuum on the secondary inlet 160 and valve 166. At this point, any liquid in the evaporative emissions system 104 (including the TPC valve, RF valve, ventilation line or recirculation line) may drain through the valve 166 and return to the fuel tank 112. For a normally open valve 166, the liquid may pass through the valve 166 once the ejector stops drawing a vacuum on the valve 166.

Various components of the fuel system 100, evaporative emissions system 104, and engine 102 are in communication with a controller 170 or control system. The controller 170 may be provided as one or more controllers or control modules for the various vehicle components and systems. The controller 170 and control system for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The controller 170 may be in communication with other vehicle sensors, such as the fuel tank pressure sensor 124, the fuel lever sensor 122, an ambient or atmospheric pressure sensor 172, and an ambient temperature/humidity sensor 174. The controller 170 may additionally be configured to receive an input from the vehicle operator via one or more buttons, touch screens, voice commands, etc., via user interface 176. In one example, the controller 170 receives an input for refueling from an operator via a refueling button on the interface 176. In response to the refueling button being actuated, the controller 170 may depressurize the fuel tank 112, and unlock a locking mechanism 128 for a refueling cap 126 or door as described further below. The controller 170 may additionally receive an input from a switch associated with the fuel fill door, fuel fill cap, or fuel fill valve to indicate that a refueling event is beginning based on opening one of these elements.

The controller is also in communication with a pressure sensor 180 that is positioned in the drain line 164 between the ejector 156 and the valve 166 to measure the pressure in or associated with the drain line between the ejector 156 and the valve 166.

The present disclosure provides a vehicle with a fuel system 100 as described herein, with a diagnostic to validate the operation of the ejector 156 and the valve 166 as described below with respect to FIGS. 2-5. The controller 170 is configured to determining a state of the valve 166 and/or the ejector 156 based on the pressure as measured by the sensor 180 in preparation for a refueling event, in response to initiation of a refueling event, or during a refueling event. The controller 170 may determine that the valve moves to the desired position during a refueling event and operates correctly, and also, that the ejector has open flow and is free of blockages.

Figure 3:
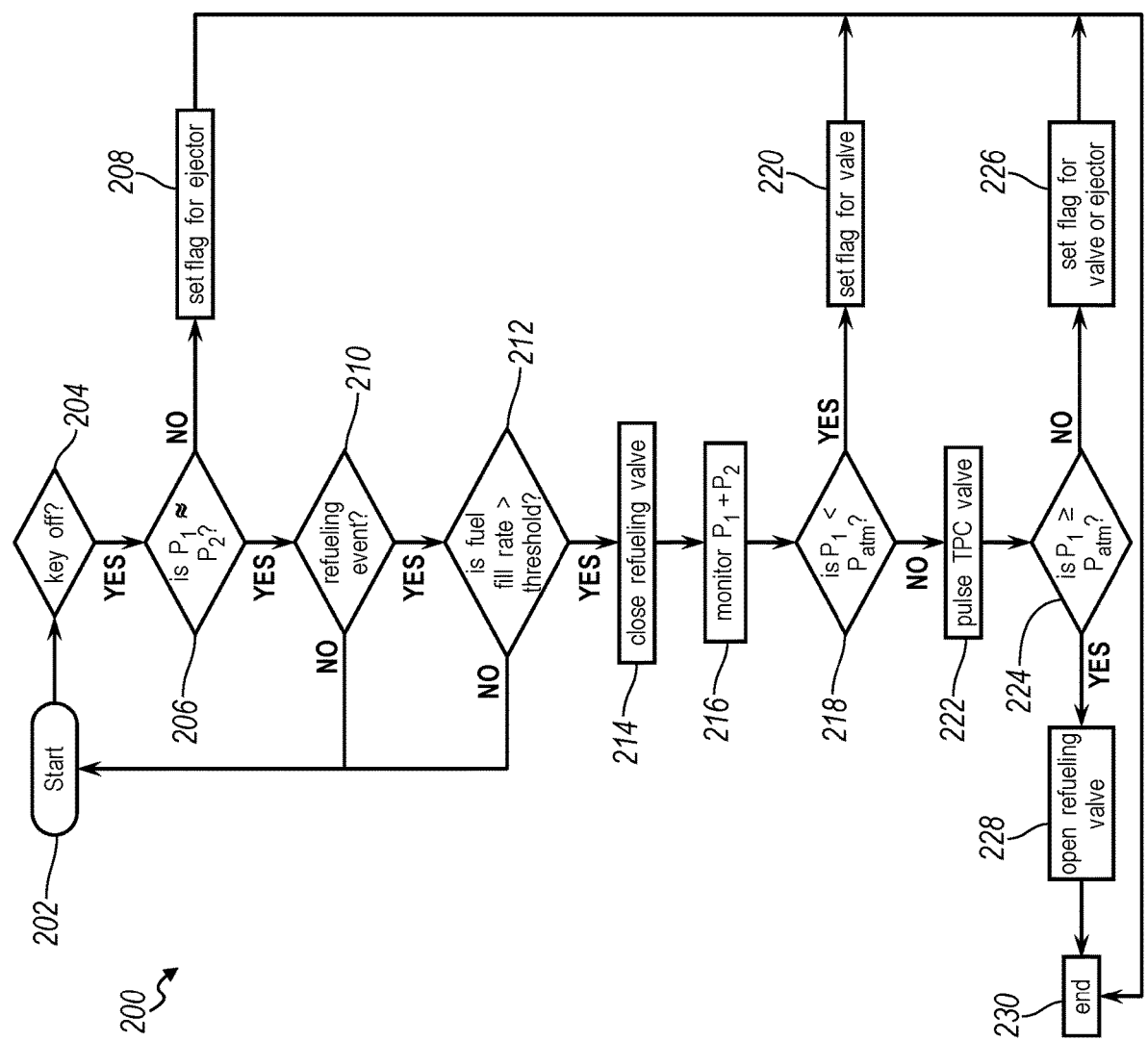
FIG. 3 illustrates a flow chart of a fueling process for a vehicle fuel system.

FIG. 3 illustrates a method 200 of fueling a vehicle, and may be used with a fuel system 100 as shown in FIG. 1 or 2. In various examples, steps in the method 200 may be performed in a different order, performed in parallel or in series, and/or added or omitted.

At step 202, the method 200 starts. The controller 170 determines if a key-off event for the vehicle or engine 102 has occurred at step 202. A key-off event at step 202 may be when the vehicle ignition switch is turned to the off position, and the vehicle, engine 102, and fuel system 100 are shut down.

After a vehicle key-off event, the controller 170 may monitor the fuel tank pressure sensor 124 and the pressure sensor 180 at step 206 at an entry condition. The controller 170 may wait until the pressures measured by the pressure sensors 124, 180 have each reached steady state, or substantially steady state before comparing the pressures from the two sensors 124, 180. As used herein, substantially means within two percent, five percent, or ten percent of a given value or rate.

At step 206, the controller 170 determines if the first pressure as measured by the sensor 180 is equal to or substantially equal to a second pressure measured by the fuel tank pressure sensor 124. Alternatively, the controller 170 determines if the first pressure is within a predetermined range of pressures above or below the second pressure, e.g. within 0.1-1.0 kPa above or below.

If the first pressure is not equal to, substantially equal to, or within a predetermined range of the second pressure, the method proceeds to step 208 and sets a flag associated with the ejector 156. When the first pressure is less than the second pressure, e.g. the first pressure is approximately atmospheric pressure, and the second pressure is a positive pressure, the controller 170 may infer that the inlet 158 to the ejector 156 has a blockage or other flow restriction, or there is a blockage in the recirculation line 150 between the fuel tank pressure sensor 124 and the ejector 156. After a flag is set at step 208, the controller 170 proceeds to step 230 and ends the diagnostic and method 200.

If the first pressure is equal to, substantially equal to, or within a predetermined range of the second pressure at step 206, the method proceeds to step 210 and the entry condition for the method 20 is met.

At step 210, the controller 170 determines if a refueling event has been initiated. The controller 170 may determine that a refueling event has been initiated based a request to unlock the refueling locking mechanism 128, or a refueling request from an operator, for example, using a switch or other input in the vehicle on an interface 176. The controller 170 may alternatively determine the refueling event based on a state of a fuel fill cap, fuel fill door 126, valve in a capless fuel tank, or the like. The controller 170 may additionally or alternatively determine that a refueling event has been initiated in response to an increasing fuel level in the fuel tank 112 as measured by the fuel level indicator 122.

Generally, during a refueling event, the fuel tank 112 is fueled with fuel from an external fuel source, such as a pump at a filling station, at step 220. As fuel flows into the fuel tank 112, vapor flows through the recirculation line 150, from the second end 154 through the ejector 156 and towards the first end 152. The flow through the ejector 156 draws a vacuum on the check valve 166 to maintain the valve 166 in the closed position, such that the drain line 164 is closed and the vapor flowing through the recirculation line 150 can only exit the recirculation line 150 at the first end 152 adjacent to the fuel filling inlet 118. As described above, this reduces vapor generation within the fuel tank 112 during refueling. If the valve is stuck in an open or closed position, or if there is a flow limitation such as a blockage in the ejector inlet or outlet, flow through the recirculation line may be affected, which in turn may lead to fuel entering the ventilation line 116, the recirculation line 150, one or both of the TPC and RF valves 138, 140, or the evaporative emissions system 104 from either the fuel tank 112 and/or the fuel filling inlet 118. Liquid within the TPC valve 138 or RF valve 140 may prevent the TPC valve 138 or RF valve 140 from closing completely, or may affect valve reliability, and so liquid within the ventilation line 116, the recirculation line 150, one or both of the TPC and RF valves 138, 140, or elsewhere in the evaporative emissions system 104 is drained via the valve 166 in the drain line 164.

With an operational valve 166 and ejector 156, if the liquid fuel is at or above the first and/or second ends 152, 154 of the recirculation line 150, vapor flow through the recirculation line 150 is interrupted or stops, and liquid may be present within the ventilation line 116, the recirculation line 150, one or both of the TPC and RF valves 138, 140, and/or the evaporative emissions system 104. With the vapor flow through the recirculation line 150 stopped while the vehicle is being fueled, the ejector 156 stops drawing a vacuum on the valve 166 such that the valve may open, and liquid fuel within the ventilation line 116, the recirculation line 150, one or both of the TPC and RF valves 138, 140, and/or the evaporative emissions system 104 may drain through the valve 166 and drain line 164 and back into the fuel tank 112. Depending on the valve 166 configuration, stopping vapor flow through the ejector 156 and/or the presence of liquid fuel on the ejector 156 side of the valve 166 may open the valve 166 to allow the liquid to enter the drain line 164 and drain to the fuel tank 112.

At step 212, the controller 170 monitors the fuel level sensor 122 to determine if the fuel fill rate is greater than a threshold value. Step 212 may be performed as low fuel fill rates may result in lower pressure changes within the fuel tank 112 and system 100, making the method 200 more difficult to perform and result in an accurate diagnostic. The controller 170 may determine the fuel fill rate from the change in fuel level as measured by the fuel level sensor 122 over time.

Alternatively, at step 212, the controller 170 may receive a signal indicative of a fuel fill rate for another vehicle at the same filling station or fuel pump as the fuel system 100 at an earlier time, and compare the fuel fill rate to the threshold value. The controller 170 may receive the signal via antenna 190 from another vehicle, the filling station, a server or cloud, or the like. The controller 170 may receive the signal over a Vehicle-to-Everything (V2X) network, or other network.

At step 214, the fueling process has begun, and the controller 170 closes the RF valve 140. At step 216, the controller monitors the first and second pressures from the pressure sensors 180, 124. The controller 170 may therefore control the RF valve 140 to a closed position in response to the refueling event, and prior to determining the state of the valve 166.

At step 218, the controller 170 determines if the first pressure is a vacuum, or is less than an atmospheric pressure as measured by the ambient pressure sensor 172. The controller 170 may additionally determine if the second pressure is a positive pressure, or a pressure that is greater than atmospheric pressure, at step 220.

If the first pressure is a vacuum pressure, e.g. is less than an atmospheric pressure, and the second pressure is a positive pressure, the method 200 proceeds to step 220 and the controller 170 sets a flag associated with the valve 166.

Figure 4:
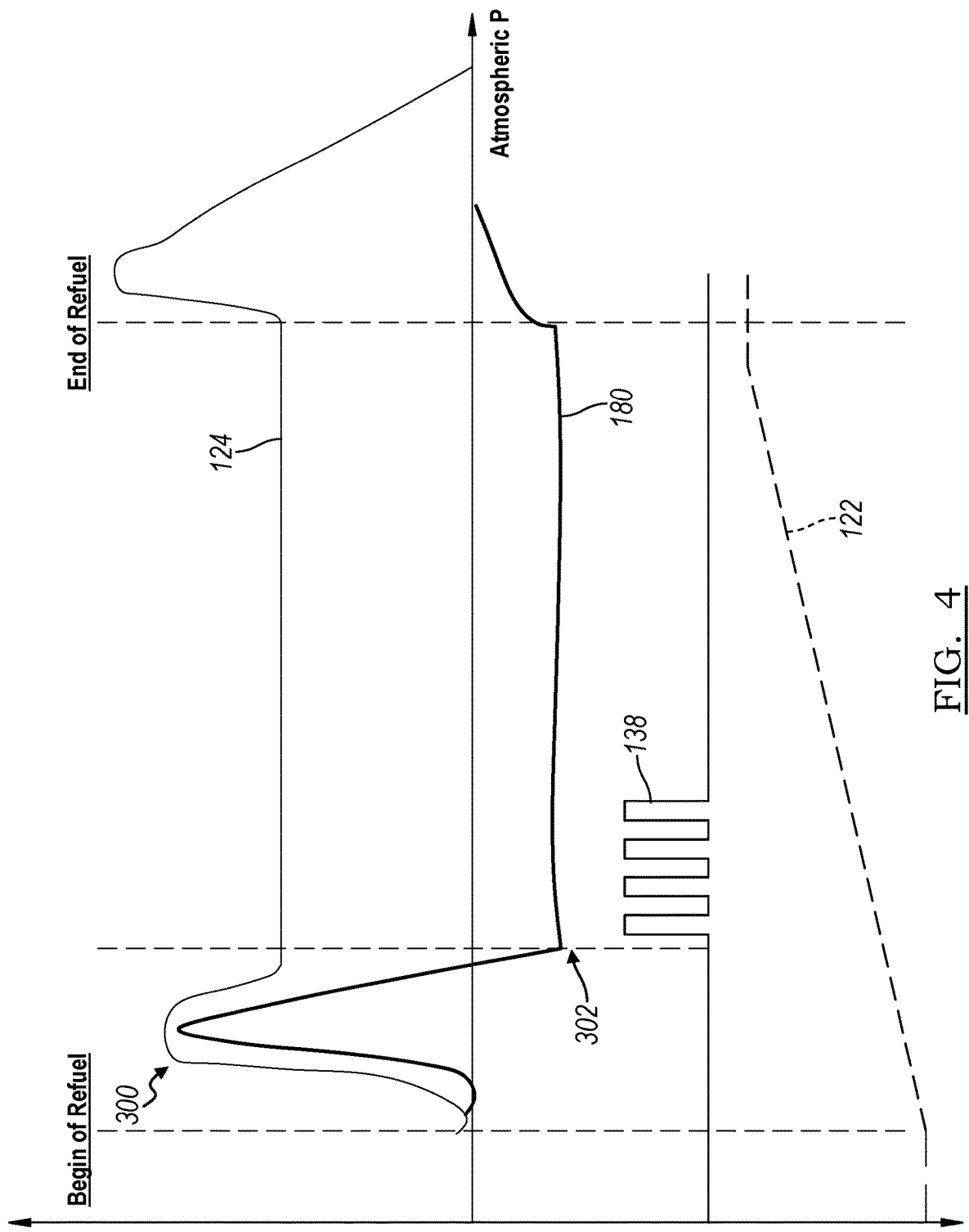
FIG. 4 illustrates a signal diagram for the vehicle fuel system and method of FIGS. 1 and 3 according to a first example.

FIG. 4 illustrates a signal diagram for the fuel system 100 during a refueling event and when a flag is set at step 220. As shown in the Figure, during the early stage of the refueling process, pressure climbs inside the fuel tank 112 as shown by the increase in the pressure as measured by the fuel tank pressure sensor 124 at region 300. The pressure sensor 180 measures a vacuum at region 302 that is generated almost immediately as the check valve 166 is in a closed position, and this vacuum generation at 302 may be generated even before the TPC valve 138 is pulsed to further increase the vacuum and bias the valve 166 towards the closed position. Note that a spring associated with the valve 166 may be selected such that a certain pressure level and flow in the recirculation line 150 is needed to overcome the spring force and move the valve 166 from the open position to the closed position. Closing the RF valve 140 and pulsing the TPC valve 138 causes the pressure in the recirculation line 150 to increase. As a vacuum is generated and measured by sensor 180 prior to pulsing the TPC valve 138, this may indicate that the check valve 166 is in a stuck closed position, and may not be able to open to drain fuel from the recirculation line 150 back into the fuel tank 112 via drain line 164. The controller 170 therefore sets the flag at step 220 that is associated with the valve 166 being in a closed position, e.g. a stuck closed valve. Step 218 and the signal diagram as shown in FIG. 4 may determine a condition associated with a stuck closed valve 166 towards the beginning of a refueling process, as shown.

Furthermore, the method 200 may monitor for a pressure increase or spike after the fuel level indicator 122 reaches a threshold fuel level, e.g. associated with a 100% fill level for the fuel tank 112. If the fuel tank 112 is trickle filled, or filled after reaching an upper threshold level, the fuel level indicator 122 may measure a pressure spike, and liquid fuel may enter the recirculation line 150 and valve 166. Liquid within the recirculation line 150 and/or valve 166 may be therefore inferred by the controller 170 in response to a pressure increase or spike as measured by the fuel tank pressure sensor 125 after the fuel level has reached an upper threshold value such as 100% fill level as measured by the indicator 122. This may be determined towards or at the end of a refueling process for the fuel tank 112. If the controller 170 infers that liquid is in the recirculation line 150 and/or valve 166, and the flag has been set at step 220, the controller 170 may assign a higher confidence value to the flag set at step 220 and the valve 166 being stuck in a closed position.

Referring back to FIG. 3, if the conditions of step 218 are not met, the controller 170 proceeds to step 222. At step 222, the controller 170 pulses or cycles the TPC valve 138. By pulsing the TPC valve 138, the controller 170 controls the valve 138 to cycle, or repeatedly open and close over a short timeframe.

At step 224, the controller 170 determines if the first pressure is a positive pressure. The controller 170 may additionally determine if the second pressure is a positive pressure at step 220. Note that step 218 is performed prior to step 222 and the TPC valve 138 being pulsed, and that step 224 is performed subsequent to step 222 and the TPC valve 138 being pulsed.

At step 224, if the first pressure is a positive pressure or atmospheric pressure, and the second pressure is a positive pressure, the method 200 proceeds to step 226 and the controller 170 sets a flag. If the first pressure is a positive pressure and within a predetermined range of the second pressure, the flag is associated with the valve 166, and/or the outlet 162 of the ejector 156, and/or the secondary inlet 160 of the ejector. If the first pressure is atmospheric pressure, the flag is associated with the inlet 158 to the ejector 156.

Figure 5:
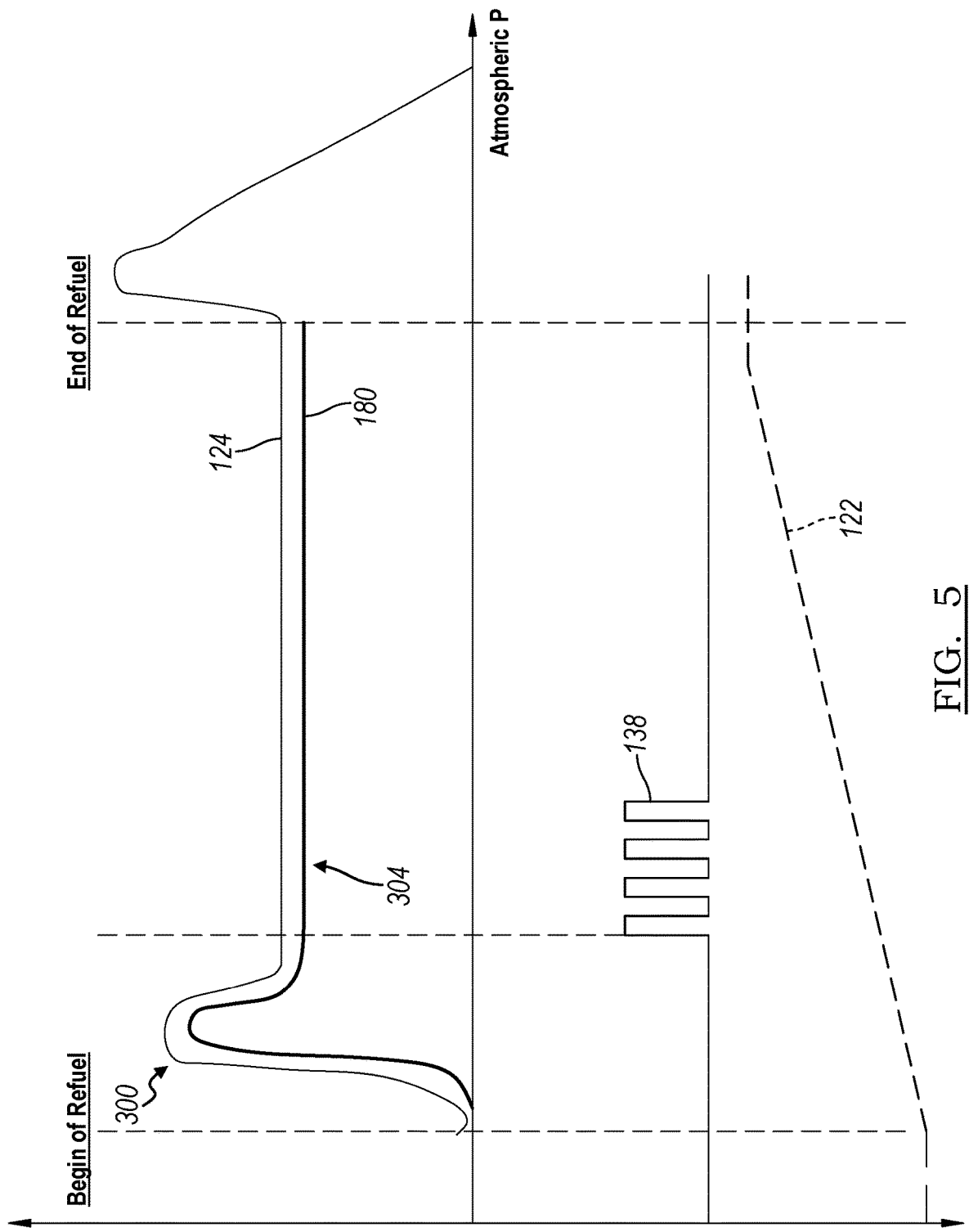
FIG. 5 illustrates a signal diagram for the vehicle fuel system and method of FIGS. 1 and 3 according to a second example.

FIG. 5 illustrates a signal diagram of a fuel system 100 during a refueling event and when a flag is set at step 226. As shown in the Figure, during the early stage of the refueling process, pressure climbs inside the fuel tank 112 as shown by the increase in the pressure as measured by the fuel tank pressure sensor 124 at region 300. The pressure sensor 180 also provides a positive pressure measurement as shown by region 304. As a positive pressure is generated and measured by sensor 180, this may indicate that the check valve 166 is in a stuck open position, and may not be able to close to maintain flow through the recirculation line 150 between the two ends. Alternatively, this may indicate that the outlet 162 and/or the secondary inlet 160 of the ejector may be blocked or obstructed such that flow through the recirculation line 150 is affected. The controller 170 therefore sets the flag at step 226 that is associated with the valve 166 being in an open position, e.g. a stuck open valve, and/or the outlet of the ejector 156 is obstructed, and/or the secondary inlet of the ejector 156 is obstructed.

Furthermore, if the pressure sensor 180 provides an atmospheric pressure measurement at region 304 instead of a positive pressure measurement as shown in the Figure, this may indicate that the inlet 158 to the ejector 156 may be blocked or obstructed such that the pressure sensor 180 is measuring atmospheric pressure via the fill port 118 and recirculation line 150. The controller 170 therefore sets the flag at step 226 that is associated with the inlet 158 to the ejector being obstructed.

Referring back to FIG. 3, if the conditions of step 224 are not met, the first pressure is necessarily a vacuum pressure, and the controller 170 determines that the state of the valve 166 matches what is predicted, and also that the ejector 156 is working without any blockages, and therefore no flag is set of the method 200 and diagnostic.

Figure 6:
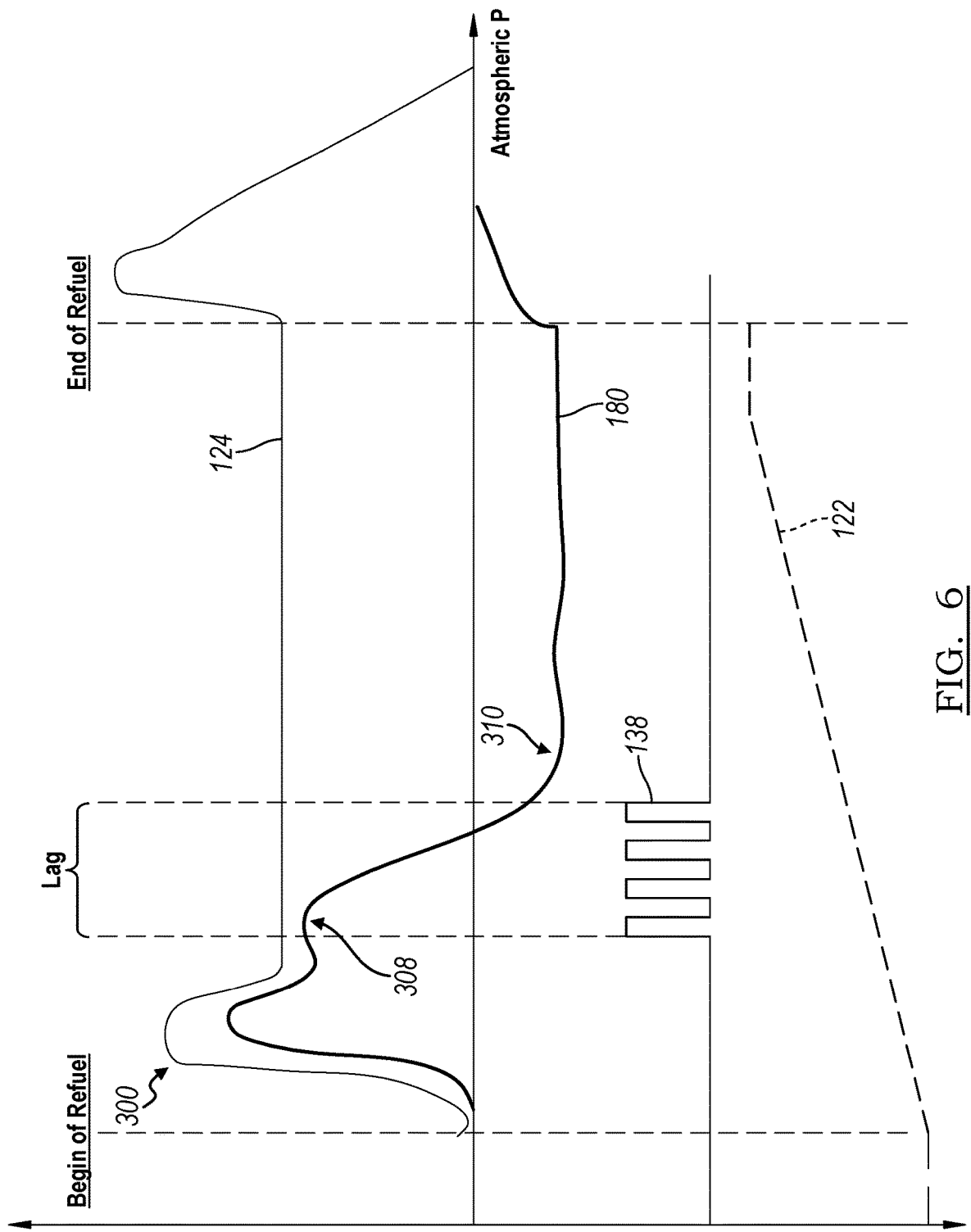
FIG. 6 illustrates a signal diagram for the vehicle fuel system and method of FIGS. 1 and 3 according to a third example.

FIG. 6 illustrates a signal diagram of a fuel system 100 during a refueling event with a valve 166 and ejector 156 under normal operating conditions and where no flags are set by the controller 170. As shown in the Figure, during the early stage of the refueling process, pressure climbs inside the fuel tank 112 as shown by the increase in the pressure as measured by the fuel tank pressure sensor 124 at region 300. The pressure sensor 180 measures a decrease in pressure as the valve 166 closes at region 308, and then subsequently measures a vacuum pressure at 310 due to the venturi effect from flow through the ejector 156 and recirculation line 150. Region 310 lags behind region 308 as the check valve 180 has to close before vacuum generates. Note that the RF valve 140 is closed and the TPC valve 138 has been pulsed to increase the pressure in the recirculation line 150, which stimulates the higher flow in the recirculation line 150, and causes the check valve 166 to close and vacuum measured by the sensor 180 to increase.

Referring back to FIG. 3, at step 228, the controller 170 opens the RF valve 140 to continue the refueling and filling process. The method 200 then ends at step 230.

When fueling is completed and after step 230, the fuel fill cap 126 is replaced, or a door to the fuel fill inlet 118 is closed, a switch signal from the fuel fill cap or fuel door is sent to the controller 170. The controller 170 may then lock the locking mechanism 128 and close the TPC and RF valves 138, 140 to end the fueling process.

Various embodiments according to the present disclosure have associated, non-limiting advantages. The ejector in the recirculation line is used to maintain a valve in a drain line in a closed position, which maintains the continuity of the recirculation line between the first and second ends. The valve may open when vapor flow through the recirculation line is interrupted to provide a drain path for any liquid fuel in the evaporative emissions system and recirculation line, and to prevent liquid fuel from entering the evaporative emissions system during refueling. The ejector and associated valve provide a passive system to control vapor flow through the recirculation line, and drainage of any liquid fuel in the recirculation line and evaporative emissions system. A pressure sensor is provided in the drain line between the ejector and the valve, and the fuel system has an associated method and diagnostic that a controller uses to determine the state of the valve and/or the ejector.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A fuel system comprising:
   a fuel tank;
   a fuel fill inlet fluidly connected to the fuel tank to receive fuel dispensed from an external fuel supply device;
   a recirculation line with a first end fluidly connected to the fuel fill inlet and a second end fluidly connected to the fuel tank;
   an ejector positioned within the recirculation line;
   a valve positioned within a drain line fluidly connecting the ejector to the fuel tank;
   a pressure sensor positioned to measure a pressure associated with the drain line between the ejector and the valve; and
   a controller in communication with the pressure sensor, the controller configured to, in response to initiation of a refueling event, determine a state of the valve based on the pressure.

2. The fuel system of claim 1 wherein the pressure sensor is a first pressure sensor and the pressure is a first pressure;
   wherein the fuel system further comprises a second pressure sensor to measure a second pressure associated with the fuel tank; and
   wherein the controller is in communication with the second pressure sensor, and is further configured to determine the state of the valve in response to an entry condition being met, the entry condition based on the first pressure and the second pressure.

3. The fuel system of claim 2 wherein the entry condition is met when the first pressure is substantially equal to the second pressure after a key-off event.

4. The fuel system of claim 2 wherein the controller is further configured to set a flag associated with the ejector in response to the entry condition not being met after a key-off event.

5. The fuel system of claim 1 further comprising a fuel level sensor positioned to measure a fuel level in the fuel tank;
   wherein the controller is in communication with the fuel level sensor, and is further configured to determine the refueling event based on an increasing fuel level.

6. The fuel system of claim 1 wherein the controller is further configured to determine the state of the valve in response to a fuel fill rate being greater than a threshold.

7. The fuel system of claim 6 further comprising a fuel level sensor positioned to measure a fuel level in the fuel tank;
   wherein the controller is in communication with the fuel level sensor, and is further configured to determine the fuel fill rate from the fuel level measured by the fuel level sensor.

8. The fuel system of claim 6 wherein the controller is further configured to receive a signal indicative of a fuel fill rate for another vehicle at a filling station.

9. The fuel system of claim 1 wherein the controller is further configured to set a flag associated with the valve in response to the pressure being less than an atmospheric pressure.

10. The fuel system of claim 1 further comprising an evaporative emissions system fluidly connected to the recirculation line between the ejector and the second end, the evaporative emissions system including a fuel vapor canister positioned to receive fuel vapor from the fuel tank via the second end of the recirculation line, the evaporative emissions system having a first valve fluidly coupling the recirculation line to the canister via a first conduit, and a second valve fluidly coupling the recirculation line to the canister via a second conduit, the second conduit in parallel to the first conduit.

11. The fuel system of claim 10 wherein the controller is further configured to control the first valve to a closed position in response to the refueling event, and prior to determining the state of the valve.

12. The fuel system of claim 11 wherein the controller is further configured to pulse the second valve in response to the refueling event and while determining the state of the valve.

13. The fuel system of claim 12 wherein the controller is further configured to set a flag associated with the valve in response to the pressure being less than an atmospheric pressure prior to the second valve being pulsed.

14. The fuel system of claim 12 wherein the controller is further configured to set a flag associated with the valve and an outlet of the ejector in response to the pressure being greater than an atmospheric pressure subsequent to the second valve being pulsed.

15. The fuel system of claim 12 wherein the controller is further configured to open the first valve subsequent to determining the state of the valve.

16. The fuel system of claim 1 wherein the ejector is positioned to draw suction on the valve to maintain the valve in a closed position in response to vapor flow through the recirculation line and the ejector during the refueling event; and wherein liquid fuel in the recirculation line flows through the valve and the drain line and into the fuel tank.

17. A method of fueling a vehicle, comprising:

dispensing liquid fuel into a fuel tank via a fuel fill inlet;

recirculating vapor from the fuel tank to the fuel fill inlet via a recirculation line with an ejector in response to the liquid fuel being dispensed;

drawing a vacuum on a check valve via the ejector thereby maintaining the check valve in a closed position to prevent fluid flow through a drain line and the check valve, the drain line fluidly connecting the recirculation line and the fuel tank;

monitoring a pressure in the drain line between the ejector and the check valve while the liquid fuel is being dispensed to determine a position of the check valve; and setting a flag associated with the check valve in response to the pressure being less than an atmospheric pressure.

18. The method of claim 17 further comprising pulsing a valve positioned between the recirculation line and a canister of an evaporative emissions system while the liquid fuel is being dispensed; and setting a second flag associated with the check valve in response to the pressure being greater than the atmospheric pressure.

19. The method of claim 17 wherein the pressure is monitored in the drain line while the liquid fuel is being dispensed to determine the position of the check valve in response to a fuel fill rate being greater than a threshold; and wherein the method further comprises receiving a signal indicative of the fuel fill rate as determined by another vehicle.

20. A vehicle comprising:

a fuel tank;

a fuel fill inlet fluidly connected to the fuel tank to receive fuel dispensed from an external fuel supply device;

a recirculation line with a first end fluidly connected to the fuel fill inlet and a second end fluidly connected to the fuel tank;

an ejector positioned within the recirculation line;

a check valve fluidly connecting the ejector to the fuel tank via a drain line, wherein the ejector draws suction on the check valve to maintain the check valve in a closed position in response to vapor flow through the recirculation line and ejector during fueling of the fuel tank, and wherein liquid fuel in the recirculation line drains into the fuel tank via the check valve and the drain line;

a pressure sensor positioned to measure a pressure in the drain line between the ejector and the check valve;

an evaporative emissions system with a fuel vapor canister, the evaporative emissions system fluidly connected to the recirculation line between the ejector and the second end via a control valve; and a controller configured to, in response to initiation of a refueling event, monitor the pressure, set a first flag associated with the check valve in response to the pressure being less than an atmospheric pressure prior to pulsing the control valve, pulse the control valve, and set a second flag associated with the check valve in response to the pressure being greater than the atmospheric pressure subsequent to pulsing the control valve.

\* \* \* \* \*